United States Patent
Bronstein et al.

(10) Patent No.: US 8,391,308 B2
(45) Date of Patent: Mar. 5, 2013

(54) DOCSIS PON

(75) Inventors: Vladimir Bronstein, Los Altos, CA (US); James Chen, Fremont, CA (US)

(73) Assignee: Hitachi Communication Technologies, Inc., Santa Clara, CA (US)

( * ) Notice: Subject to any disclaimer, the term of this patent is extended or adjusted under 35 U.S.C. 154(b) by 308 days.

(21) Appl. No.: 12/565,646

(22) Filed: Sep. 23, 2009

(65) Prior Publication Data

US 2011/0069953 A1   Mar. 24, 2011

(51) Int. Cl.
*H04J 14/00* (2006.01)
(52) U.S. Cl. ........ 370/419; 370/230; 370/227; 370/392; 370/474; 398/45; 398/58
(58) Field of Classification Search .......... 370/227, 370/228, 392, 474; 398/58
See application file for complete search history.

(56) References Cited

U.S. PATENT DOCUMENTS

| | | | |
|---|---|---|---|
| 7,324,515 B1 * | 1/2008 | Chapman | 370/392 |
| 2003/0137934 A1 * | 7/2003 | Schaller et al. | 370/227 |
| 2005/0262211 A1 * | 11/2005 | Yamashita | 709/206 |
| 2006/0171714 A1 * | 8/2006 | Dove | 398/71 |
| 2008/0069564 A1 * | 3/2008 | Bernard | 398/72 |
| 2008/0232801 A1 * | 9/2008 | Arnold et al. | 398/58 |
| 2009/0044240 A1 | 2/2009 | Sniezko et al. | |
| 2009/0074412 A1 * | 3/2009 | Liu et al. | 398/59 |

* cited by examiner

*Primary Examiner* — Andrew Chriss
*Assistant Examiner* — Mohamed Kamara
(74) *Attorney, Agent, or Firm* — Haynes and Boone, LLP (57) ABSTRACT

In accordance with a first aspect of the disclosure, a system is provided. The system includes: an optical line terminal (OLT) shelf including a plurality of optical line cards, each optical line card supporting at least one passive optical network (PON) interface for communicating with a corresponding set of optical network units (ONUs), the OLT shelf thereby corresponding to a plurality of sets the ONUs; a system card controller for controlling the plurality of optical line cards; and a DOCSIS proxy for emulating a cable modem (CM) SNMP agent for each ONU, the DOCSIS proxy being responsive to an SNP manager in a DOCSIS NMS to configure the ONUs accordingly.

13 Claims, 4 Drawing Sheets

DOCSIS PON

TECHNICAL FIELD

This application relates to network management and more specifically to the adaptation of a passive optical network (PON) to the Data Over Cable Service Interface Specification (DOCSIS) standard.

BACKGROUND

Cable systems evolved initially to merely provide video to their customers' televisions. There was no upstream traffic from the customer over the cable system; instead all traffic (analog video) traveled downstream to the end users. However, as technology evolved, customers wanted to have both downstream and upstream data capability. To permit this two-way data traffic, cable operators adapted the head end of their cable networks with a "cable modem termination system" (CMTS) that communicated with a customer cable modem (CM) through the coaxial CATV cables. In this fashion, a user's PC could access the Internet though their cable modem, which received data from the corresponding CMTS. During the 1990's, the development of such data modifications for the large cable system operators (designated as multiple system operators (MSOs)) flourished. But there were competing standards such that an MSO would have to adapt to one protocol or the other to provide this data capability.

In contrast, a universal standard would lower costs for the MSOs since the equipment vendors would all have to compete head-to-head to meet this common standard. Thus, the MSOs initiated a consortium known as Data Over Cable Service Interface System (DOCSIS) that promulgated the resulting universal DOCSIS standard in the mid-1990's. A vendor that wanted to provide CMs or CMTSs would first have to get their designs certified through the DOCSIS consortium, whereupon they could sell to the MSOs or their customers. The resulting efficiency and cost savings combined with the already extensive and massive reach of the MSOs' networks made DOCSIS CMs the dominant way for U.S. users to access the Internet.

As technology has continued to evolve since the inception of DOCSIS, DOCSIS itself has evolved in turn such that various enhancements have been standardized. For example, DOCSIS 1.0 evolved to DOCSIS 1.1, then DOCSIS 2.0, and finally DOCSIS 3.0. But all these more modern flavors of DOCSIS maintain backwards compatibility with previous versions. Thus, DOCSIS has continued to dominant the market for broadband access despite the evolution of telecommunication alternatives such as DSL. Although DOSCIS has continued to evolve in this fashion, there are fundamental limits to the bandwidth that cable systems can provide. This is a problem as bandwidth demands have exploded with the development of "triple play" systems that offer video, data (Internet access), and voice (telephone) services. These bandwidth demands have been exacerbated with the mushrooming growth of high definition video content.

In contrast to conventional DOCSIS systems, optical fiber has abundant bandwidth to accommodate the modern demands for more and more bandwidth. In particular, the development of passive optical network (PON) technology offers an attractive alternative to cable with regard to meeting modern demand for bandwidth. As implied by the name, PON does not use any active means to amplify the transmissions between customer premises and the PON head end. This passive transmission keeps costs down and keeps the network relatively simple and easier to manage. These cost savings are enhanced further in a particular form of PON known as Ethernet PON (EPON) because EPON leverages the robust Ethernet (IEEE 802) standard. The EPON version of the "local loop" (the last segment in a communication network) has multiple optical network units (ONUs) at customer locations such as homes or businesses coupled by passive devices to a single optical line terminal (OLT) that may be located in the central office of an MSO. It may thus be seen that the EPON OLT is analogous to a DOCSIS CMTS whereas the ONUs are analogous to the CMs.

EPON is thus an attractive alternative for MSOs to upgrade their networks and compete with alternative PON systems offered by telecommunication competitors such as Verizon's FIOS. However, the MSOs have invested billions of dollars in their existing DOCSIS cable networks. Part of this investment includes the existing DOCSIS network managing and provisioning tools. Thus, approaches have been developed to adapt the DOCSIS protocol used by these tools to the management of EPON local loops. But these interworking approaches between DOCSIS management tools and EPON local loops have proven to be non-scalable and inefficient.

Accordingly, there is a need in the art for an efficient and scalable approach to manage EPON local loops with DOCSIS network management tools.

SUMMARY

In accordance with a first aspect of the disclosure, a system is provided. The system includes: an optical line terminal (OLT) shelf including a plurality of optical line cards, each optical line card supporting at least one passive optical network (PON) interface for communicating with a corresponding set of optical network units (ONUs), the OLT shelf thereby corresponding to a plurality of sets of ONUs; a system controller card for controlling the plurality of optical line cards; and a DOCSIS proxy for emulating a cable modem (CM) SNMP agent for each ONU, the DOCSIS proxy being responsive to an SNP manager in a DOCSIS NMS to configure the ONUs though the system controller card accordingly.

In accordance with another aspect of the disclosure, a system is provided. The system includes: an optical line terminal (OLT) shelf including a plurality of optical line cards, each optical line card supporting at least one passive optical network (PON) interface for communicating with a corresponding set of optical network units (ONUs), the OLT shelf thereby corresponding to a plurality of OLTs for communicating with a plurality of sets of ONUs; and a system controller card for controlling the plurality of optical line cards; and a data over cable service interface specification (DOCSIS) proxy operable to emulate a cable modem with regard to each ONU such that the DOCSIS proxy provisions each ONU according to a corresponding emulated cable modem's configuration file.

DETAILED DESCRIPTION

Figure 1:
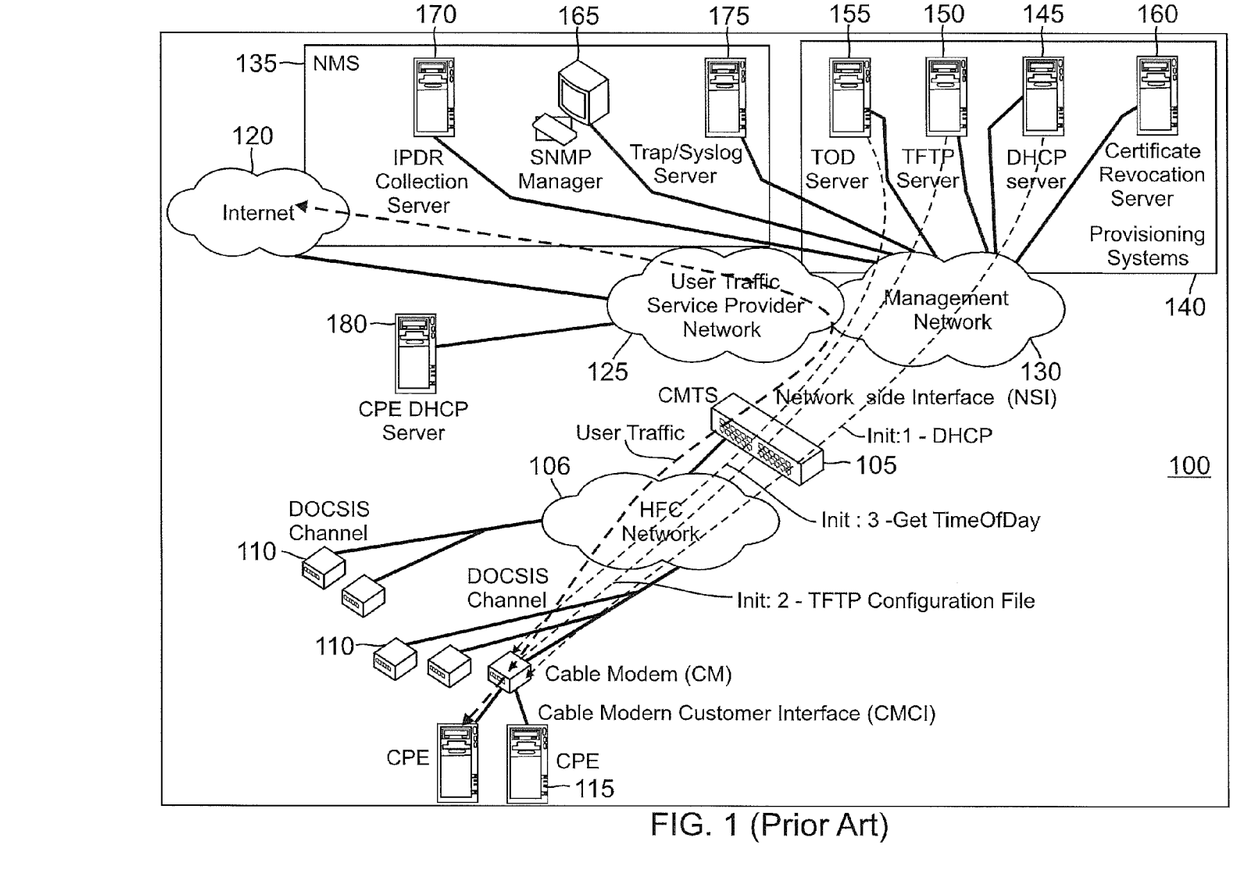
FIG. 1 illustrates a conventional DOCSIS management architecture for a coaxial cable network.

A DOCSIS proxy server is disclosed that enables DOCSIS network management tools to manage EPON network nodes in a scalable and efficient manner. This DOCSIS proxy architecture may be better understood with regard to the following discussion of DOCSIS network management DOCSIS Management Architecture A conventional DOCSIS management architecture 100 is shown in FIG. 1. A DOCSIS network local loop exists between a cable modem termination system (CMTS) 105 and a plurality of cable modems (CMs) 110 in the form of a hybrid fiber cable (HFC) network 106. Each CM may couple one or more Customer Premises Equipment (CPE) such as PCs 115 to an external network such as Internet 120. A user traffic service provider network 125 serviced by the MSO controlling the DOCSIS management couples user data traffic to and from the Internet through a service provider router (not illustrated) so that the CMs operate as if they were a node on the Internet.

But the CMs also sit as nodes on a management network 130 that is transparent to the CPE users. It is through this management network that the DOCSIS network management tools configure and manage the CMTS and its CMs. It will be appreciated that architecture 100 includes one CMTS for illustration clarity only—indeed, it is customary that multiple CMTS's and their CMs are managed through the management network.

The DOCSIS management performed through the management network may be classified into two major areas: provisioning and monitoring. To make the terminology a bit more challenging, it is conventional in DOCSIS to also refer to the monitoring prong of DOCSIS management as the network management system (NMS). To keep the distinctions clear between DOCSIS management, which includes the provisioning and monitoring prongs, the monitoring tools within architecture 100 will be referred to as an NMS 135 whereas the provisioning tools are collectively referred to as a provisioning system 140.

DOCSIS provisioning through provisioning system 140 involves the configuration of the network elements (each CMTS and its CMs) to receive network services. The network elements themselves take an active part in provisioning For example, each CM goes through a boot-up provisioning process upon power-up and establishing an initial communication channel through the CMTS. To perform this active role in provisioning at boot-up, each CM accesses a DHCP server 145 in the provisioning system to obtain initial configuration information such as the IP address of a TFTP server 150 in the provisioning system and the name of a corresponding configuration file on this server. In this fashion, each CM may request its configuration file from the TFTP server. Having downloaded its configuration file, each CM decodes the DOCSIS information elements/encodings contained in this file and applies them to its own configuration. In addition, provisioning involves the CMs obtaining time of day (TOD) information from a TOD server 155 in the provisioning system. The resulting data flows are shown in FIG. 1. For example, a path denoted as "Init:1" represents the transmission of the TFTP IP address and configuration file name to a requesting CM. A path denoted as "Init:2" represents the transmission from the TFTP server to this CM of its configuration file. Finally, a path denoted as "Init:3" represents the transmission of the TOD from the TOD server to this CM. After the CM has configured itself and established a channel with the CMTS, it must be registered by the CMTS before it can access the Internet. Pursuant to this registration process, a certificate revocation server 160 in the provisioning system determines whether any CMs are revoked such that they are not allowed service.

After the configuration of the network elements occurs through the provisioning system, the NMS performs performance management and fault management using Simple Network Management Protocol (SNMP). Thus, each CM and CMTS is managed through corresponding Management Information Bases (MIBs) as known in the SNMP arts through an SMMP manager. Fault management may occur through SNMP traps or notification when events of interest happen in the network nodes (the CMs and their CMTSs). In addition, there are special status values in the network element's MIBs that may be interpreted as alarm conditions representing some type of fault. The network elements may also report faults through syslog messages collected by a trap/syslog server 175. As implied by the name, server 175 may also collect SNMP traps. Should the NMS system be implemented in a DOCSIS 3.0 compliant network, additional fault monitoring capability occurs through an Internet Protocol Data Record (IPDR) server 170 such that bulk statistics on network and element performance can be reported through server 170. It will be appreciated that the various elements in the management network system and the provisioning system are illustrated as separate elements simply because they represent separate functional elements: for example, the DHCP server and the TFTP server may be co-located in a single computer as may the other provisioning and NMS elements.

The management network and the user traffic service provider network are two separate IP networks although they may be overlaid with each other over common physical interfaces to the various entities that couple to both networks. The IP addresses on the management network are typically private since they are assigned by the DOCSIS network operator. In contrast, the user traffic network IP addresses are usually public IP addresses selected from a block of available addresses assigned to the MSO to the CPEs, a CPE DHCP server 180, and also the MSO's routers (not illustrated). The upstream interface for the CMTS is designated as a network side interface (NSI) whereas the interface between the CPEs and their CMs is designated as the cable modem customer interface (CMCI). The customer and management traffic downstream from the NSI interface is combined but upstream of the NSI, they are separated into the user traffic service provider network and the management network as illustrated in FIG. 1.

The DOCSIS Proxy for PON

1) Monitoring through the Proxy

A PON such as EPON differs significantly from the DOSCIS network discussed with regard to FIG. 1. For example, a CM has an IP address on the management network and runs an SNMP agent on this address. But an EPON optical network unit (ONU), which may be analogized broadly to a CM modified to communicate in the upstream direction using an optical fiber instead of a coaxial cable, has no IP address. Moreover, it may be expensive and inconvenient to modify existing ONU firmware to accommodate the DOCSIS SNMP agent. To enable the provisioning system and the NMS discussed with regard to FIG. 1 to manage a PON, a DOCSIS proxy server is introduced between the PON and these DOCSIS management tools. The following discussion is directed to the implementation of a DOCSIS proxy for an EPON but it will be appreciated that this example is readily adapted for other types of PONs such as GP ON.

Figure 2:
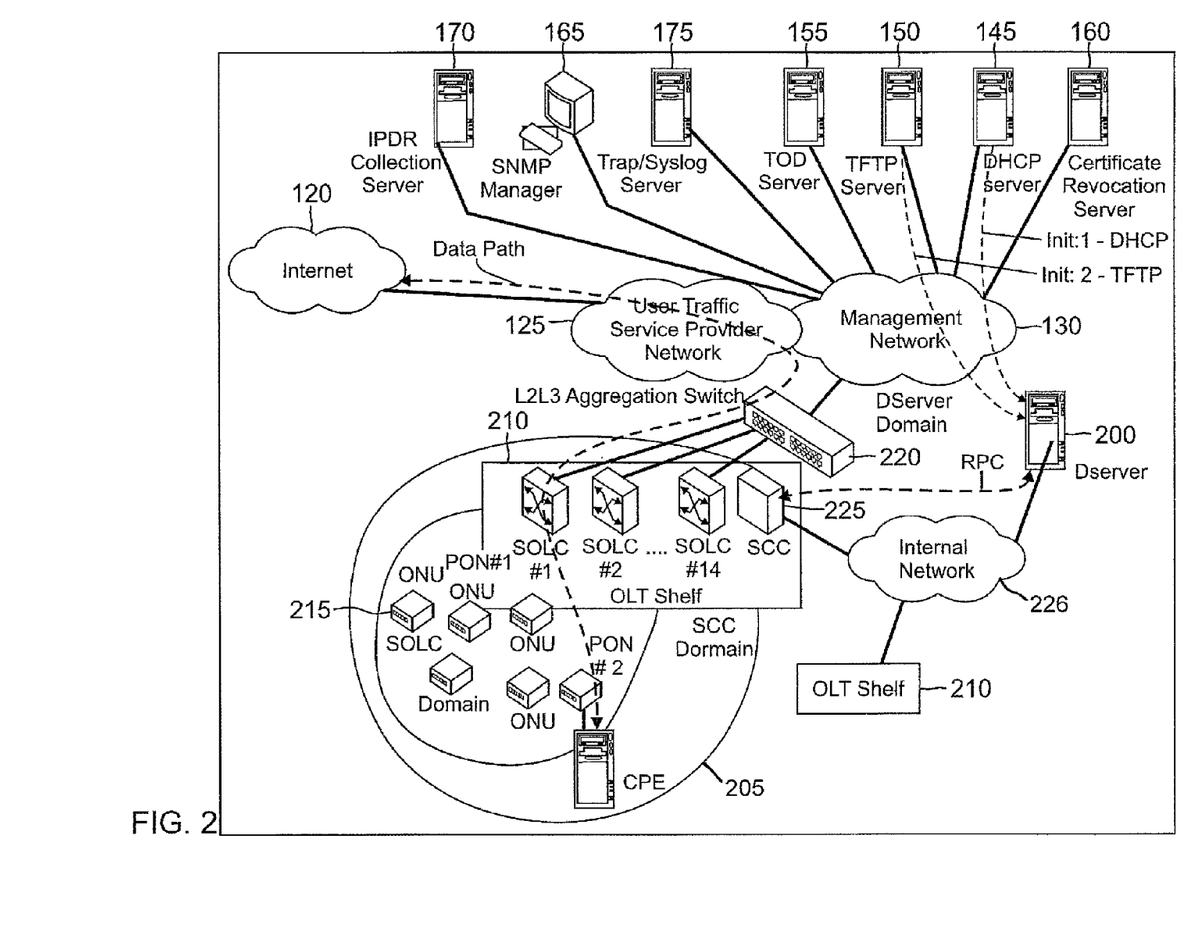
FIG. 2 illustrates a DOSCIS management architecture using a DOSCIS proxy to manage a PON.

Turning now to FIG. 2, a DOCSIS proxy server 200 (designated as a "DServer") is introduced between an EPON 205 and the DOCSIS management elements discussed with regard to FIG. 1. The ONU elements include an OLT shelf 210 that functions as multiple OLTs as discussed further. As used herein, a single OLT refers to that structure and its associated functionality to support the 1 Gigabit transmission rate (both upstream and downstream) with its associated ONUs. Because an EPON is passive, there is only a certain maximum number of ONUs that may be serviced by any given OLT in that additional passive splitting of the downstream signal from the OLT will degrade the signal such that the ONUs are unable to decode it. But regardless of the upper limit of ONUs accommodated by any given OLT, it may be seen that shelf 210 can thus support a relatively large number of ONUs depending on the total number of OLTs the shelf is configured to represent. To emulate the high-capacity single NSI interface from a CMTS, the various OLTs configured within shelf 210 couple through an aggregation switch 220 to provide data traffic to the user traffic service provider network. Aggregation switch 220 may also couple to the management network for transmission of DOCSIS management information. Switch 220 may be a layer 2 (L2) switch (bridge) or an L2/layer 3 (L3) switch/router. In that regard, switch 220 may comprise a multiple hierarchy of aggregation devices, in which a lower level comprises L2 switches whereas the higher levels comprise an L3 switch/router. As seen in FIG. 2, DServer/DOCSIS proxy 200 may perform the interworking between a plurality of OLT shelves 210 and the DOCSIS network management tools.

Despite the number of OLT shelves being supported by the DOCSIS proxy, on a logical level they may all be represented as a single CMTS. Of course, on a physical level, each OLT shelf is represented as a single entity. Thus, the DOCSIS proxy effectively hides the complexity of multiple OLT shelves from the DOSCIS management tools since they all constructively appear as one CMTS to these tools. The coupling of the aggregation switch to the management network allows an operator to directly control the switch. However, in an alternative embodiment, the aggregation switch may be coupled to an internal network 226 that the DOCSIS proxy uses to control the various EPON network elements such as the OLT shelf. In this fashion, the aggregation switch would no longer be directly accessible through the management network as are the remaining EPON elements. Thus EPON 205 may be considered to be within a DOCSIS proxy domain whose management is not directly accessible through the management network.

In one embodiment, the OLT shelf is configurable with multiple system optical line cards (SOLCs). For example, OLT shelf 210 may accommodate up to fourteen such cards, ranging from an SOLC #1 to an SOLC #14. Each SOLC may include two OLT interfaces for downstream traffic and two Gigabit-Ethernet (GigE) interfaces for the NSI side. A system controller card (SCC) 225 acts as a shelf manager and couples to the internal network controlled by the DOCSIS proxy. Thus management and data traffic at the NSI is thus segregated in this fashion.

The functionalities discussed herein for the DOCIS proxy may be distributed such as within the OLT shelf but a discrete and separate location such as a workstation for the DOCSIS proxy as opposed to an embedded location offers some advantages in that the existing firmware for EPON devices may be left unaltered. Moreover, a workstation has fewer processor and memory constraints than embedded devices. In addition, by keeping the DOCSIS proxy as a discrete device, the resulting solution is advantageously scalable: the addition of multiple OLT shelves is readily accommodated by the discrete DOCSIS proxy. Furthermore, such a location for the DOCSIS proxy enables it to perform IP address management for the SCCs, which simplifies large deployments. Finally, a discrete location for the DOCSIS proxy makes the translation of multiple OLT shelves to emulate one large CMTS very efficient. Although such a discrete location offers these advantages, some embodiments may desire an embedded and/or distributed implementation of the DOCSIS proxy to minimize the vulnerability to the failure of a single hardware unit. Thus, it will be appreciated that the DOCSIS proxy may be implemented and located as desired—it need not be a discrete proxy in a stand-alone platform such as a workstation. The remaining discussion will thus assume that the DOCSIS proxy is a stand-alone device without loss of generality.

Figure 3:
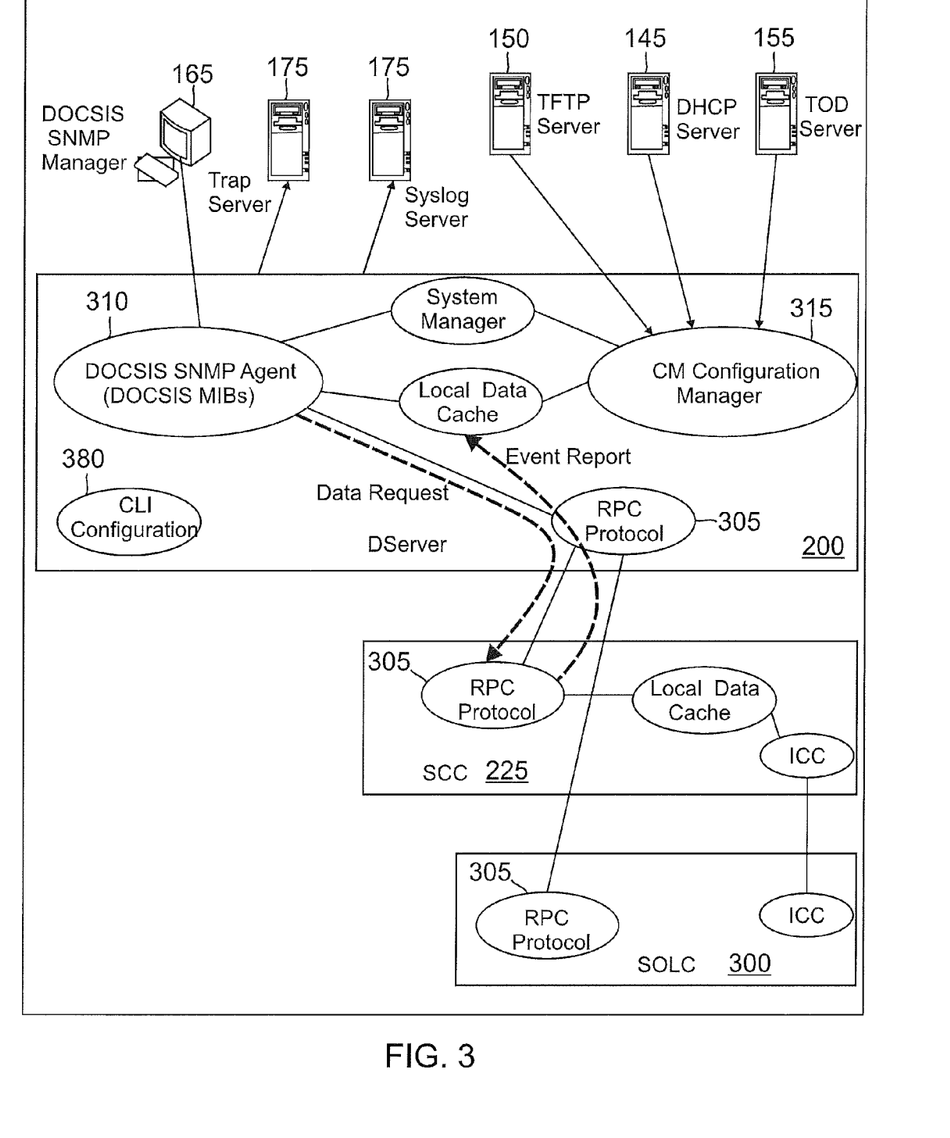
FIG. 3 is a block diagram illustrating software functionalities in the DOCSIS proxy and PON elements from FIG. 2.

Various software functionalities for an embodiment of DOCSIS proxy 200 are illustrated in FIG. 3. Because the proxy and SCC 225 have distinct processors with respect to each other, a convenient software protocol to allow the DOCSIS proxy to initiate some SCC-processor-implemented action in the SCC is the use of a Remote Procedure Call (RPC) protocol. In alternative embodiments, software analogs to an RPC protocol may be used to perform the same remote initiation. RPC protocol also allows the DOCSIS proxy to control an SOLC 300 through the SCC. Thus, the DOCSIS proxy as well as the SCC and the SOLC include an RPC software functionality module 305. This RPC protocol is built on top of whatever Inter Card Communication (ICC) protocol that enabled the SCC and the SOLC to communicate. Communication between these cards and the ONUs may remain within this ICC protocol without requiring use of an additional RPC protocol. Each of the elements shown in FIG. 3 includes a local data cache to enable, for example, the quick and easy access of data as well as global sorting or indexing of data.

As discussed previously, the DOCSIS proxy functions such that the ONUs appear as CMs to the DOCSIS management tools. But CMs have SNMP agents and associated MIBs whereas an ONU does not. To avoid a possibly undesirable modification of existing ONU firmware to accommodate this SNMP agent, the proxy may include a DOCSIS SNMP agent proxy 310 that emulates the ONU SNMP agents as well as their associated MIBs. Ideally, all three protocol versions of SNMP should be supported by the DOCSIS SNMP agent proxy. An ONU SNMP agent provides generic access responsive to the passive side of the SNMP protocol: SET/GET request reception, SET/GET response generation, and TRAP generation. Agent proxy 310 registers software hooks for the MIB objects of interest such as scalar variables, tables, etc. at run-time or by statistically generated code. Thus, when a request arrives at agent proxy 310 via the SNMP protocol from SNMP manager 165 for a GET or a SET action with regard to a particular MIB object—the software hook is being called with additional parameters specifying what value is to be set, etc. Agent proxy 310 must also emulate the trap generation that would otherwise be performed by the ONUs. This trap generation may occur through an API that formats the appropriate variables to be sent with the trap and also formats the trap itself.

The agent proxy faces a problem in that, in general, it is well known to introduce an SNMP agent proxy for managing a collection of non-SNMP elements. For example, commercially available SNMP agent proxies are available for the management of non-SNMP network nodes. To enable this management, a conventional SNMP agent proxy includes a customized MIB. For example, the customized MIB may include multiple instances at each MIB variable. Thus, suppose one multiple-instance MIB variable represents the temperature of each non-SNMP network node. Each instance thus corresponds uniquely to a given node. The SNMP manager for these nodes would thus be informed of this correspondence so it can correlate any given MIB instance with the appropriate network node. But such a customized MIB in unavailable for the DOCSIS proxy since the network management tools would thus also have to be re-configured with this customized MIB. In that regard, the MIB for a DOCSIS CM has no means within it to tie it to its CM because there was no need for such a capability: the CM included an SNMP agent that very well knew what its IP address was and so the CM MIB need not include anything further to tie it to this IP address.

SNMP agent proxy 310 must thus manage multiple instances of MIBs, where each MIB corresponds uniquely to an associated identity (the IP address used in the DOCSIS management system to manage the associated CM) but lacks any means within the MIB to indicate this correspondence. To enable this correspondence, proxy 310 may include a database that associates with the necessary MIBs. Because each CM MIB has the same tree structure, each variable in the MIB may be mapped to a corresponding array in the database. This mapping array has one or more dimensions corresponding to the variable instances across the MIBs—if the variable is a scalar, this would require just one dimension whereas if the variable is a row, the vector would require two dimensions dedicated to the corresponding two scalar values for each value in the row, and so on. But there is another dimension in this mapping array that corresponds to an "AgentID" array index. This index maps to each ONU in pre-determined fashion. For example, suppose the MIB variable was a scalar variable denoted as "SysName." The mapping array would then be a one-dimensional row (or column) having values identified as "Sysname[agentID]."

In general, proxy 310 will be configured with multiple IP addresses, where each IP address represents the IP address of a simulated agent for a given ONU. Proxy 310 will thus store a mapping that uniquely maps the AgentID values to the IP address. The proxy 310 may then monitor the appropriate port number (a standard port number is 161 in UDP) at all these IP addresses. The combination of the port number and the IP address constitutes a unique Internet socket. Thus, when proxy 310 receives an SNMP PDU at a given one of these sockets, it may retrieve the corresponding IP address for this socket—this is not a function supported by conventional SNMP engines and so would require a modification of such an engine to perform this retrieval act. The software process initiated by the receipt at this socket continues by associating this retrieved IP address with the corresponding AgentID so that it may be written into a local thread variable. Control may then be returned to the SNMP engine to further decode the PDU and call an appropriate MIB handling function. This MIB handling function may then read the current AgentID from the thread variable. By processing this AgentID through the stored mapping, the MIB handling function identifies the corresponding IP address so that this IP address can be checked to see if this MIB object should be available on the specific agent. Assuming that the MIB object is available, the MIB handling function accesses the corresponding instance in the array responsive to the PDU decoding and the AgentID index.

2) Provisioning through the Proxy

Figure 4:
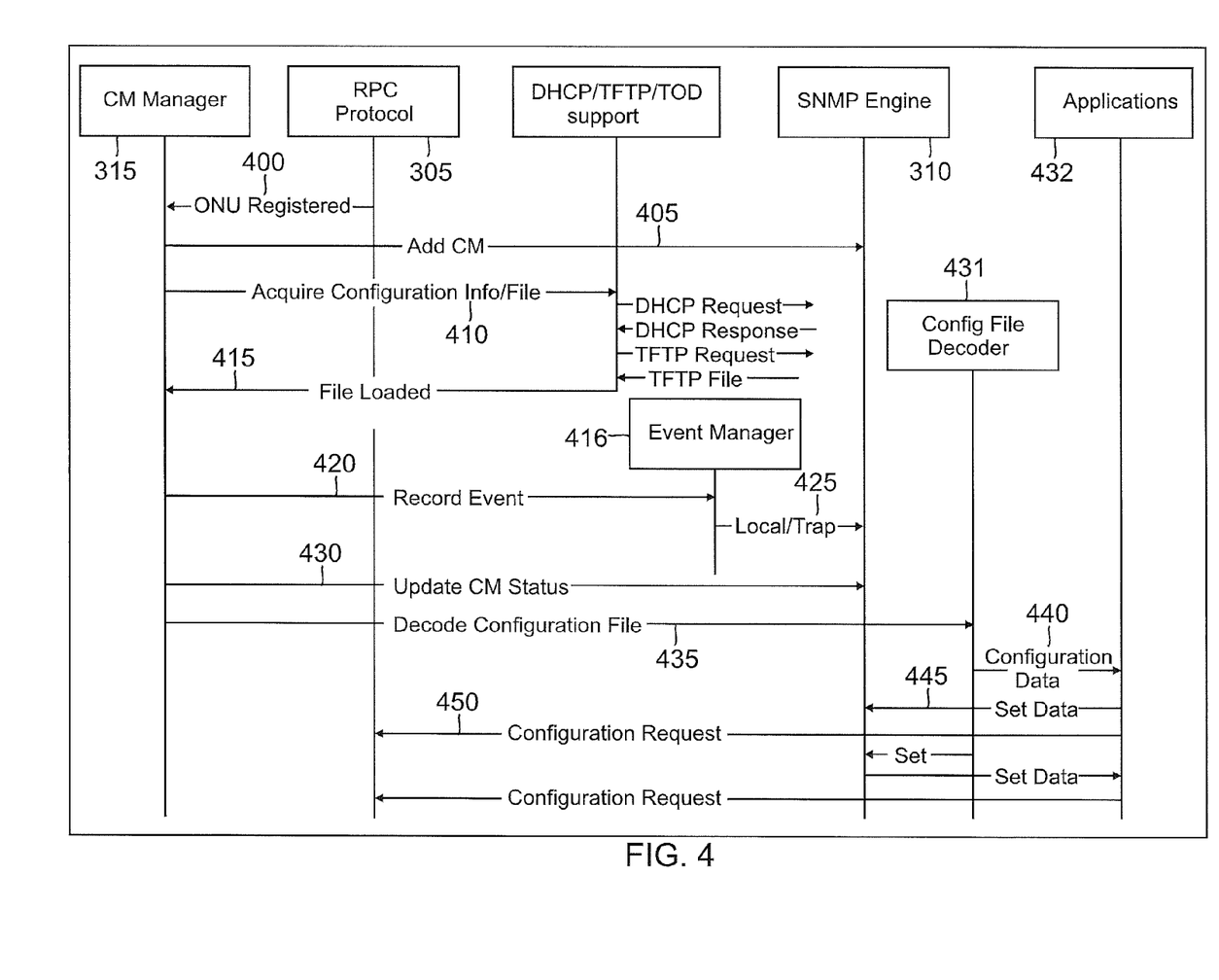
FIG. 4 is a process flow diagram illustrating the software interactions for emulating a CM provisioning for an ONU.

The DOCSIS proxy must also emulate the necessary DOCSIS provisioning in addition to the SNMP NMS management as just described through the SNMP agent proxy. For a DOCSIS operation system support (OSS) platform to manage a passive optical network, it must account for the differences in physical data transmission methods (such as modulation schemes, data rate, and PHY)) and the management communication protocols (provisioning, security, management, OAMP) between the two systems. The proxy server 200 acts as middleware to translate between the requirements of DOCSIS OSS and PON. An example process by which a CM configuration manager such as manager 315 of FIG. 3 emulates this provisioning is shown in FIG. 4. This process begins when an ONU is initially registered to its OLT. A report of this registration transfers from the ONU to the SCC card using an appropriate protocol such as ICC. In response, the SCC card issues an RPC request 400 to the DOCSIS proxy CM configuration manager 315 to report this ONU registration. The CM manager may then call the SNMP engine within the SNMP agent proxy 310 to create a new entry for this constructive "CM" through act 405 (in reality, this new "CM" is the ONU just registered at the OLT). The subsequent acts in FIG. 4 would also be associated with an update to the SNMP engine in this fashion but are not illustrated for clarity. As discussed previously, the provisioning of a CM involves the CM requesting the TFTIP address and a configuration file name from the provisioning system's DHCP server and then obtaining the configuration file from the TFTP server. The CM manager commands these provisioning steps as represented by the acquire configuration information command 410—this is represented as a single command for illustration clarity. The successful loading of the configuration file into the software module configured for the necessary DHCP/TFTP/TOD support is reported through act 415. The CM manager may then instruct an event manager 416 in the proxy to record this successful loading event through a command 420 whereupon the event manager may record this result using a trap 425 from the SNMP engine. Alternatively (or in addition), the CM manager may command the SNMP engine to update the CM status with a command 430. The CM may then command a configuration file decoder software module 431 in the proxy to decode the configuration file with a command 435. The resulting configuration data flow 440 to appropriate configuration applications 432 in the proxy enters the corresponding data into the supported MIBs using a SET command 445 issued to the SNMP engine. In response, the applications transfer the configuration data using a configuration request 450 to the SCC's RPC protocol engine. Additional set commands and associated configuration requests complete the provisioning of this newly-added CM. It will be appreciated that the software flow discussed with regard to FIG. 4 is merely one possible instantiation in that such a provisioning could be effectuated in numerous alternative fashions.

Referring back to FIG. 3, additional provisioning of the CMTS may occur through the SNMP engine or a command line interface (CLI) configuration engine 380. For example, items shared by a large number of CMs/ONUs such as Named Service Classes or Filters may be configured through engine 380. Alternatively, the items for the CMTS or its NSI may be configured in this fashion such that all the conventional DOCSIS configuration operations remain the same even though the physical elements in the PON are different.

Support for DOCSIS QoS

DOCSIS OSS also supports quality of service (QoS) management that is supported through the proxy server 200. DOCSIS QoS involves two major operations. A first operation involves classifying a packet as belonging to a certain service flow. A second operation involves applying traffic management actions to a packet according to configured service flow characteristics. DOCSIS proxy server 200 supports the full set of QoS classification rules defined by DOCSIS and performs decoding of classifiers from a configuration file and reflects them via the appropriate SNMP MIBs.

With respect to traffic handling and applying traffic management actions, it will be appreciated that PON standards such as EPON standards have some differences from DOCSIS specifications. In the upstream direction, DOCSIS specifies several scheduling types including: Best Effort, Non-Real-Time Polling, Real-Time Polling, Unsolicited Grants with Activity Detection, and Unsolicited Grants. Due to EPON's much higher bandwidth and lower number of subscribers, EPON continuously polls subscribers in real-time. Therefore, there are only two scheduling types possible in EPON—Real-Time Polling and Unsolicited Grants. The DOCSIS proxy server 200 thus maps all other DOCSIS scheduling types into Real-Time Polling.

Traffic description parameters such as max rate, min rate, burst size, max latency, etc. are supported for scheduling traffic in the EPON upstream and downstream directions in the same way as discussed with regard to scheduling. DOCSIS specifies a large number of traffic flows that have to be supported by a CM and therefore also by an ONU. Such support occurs through the use of multiple EPON logical link IDs (LLIDs) per ONU as an analogue of DOCSIS service flow IDs (SFIDs).

DOCSIS Filtering

DOCSIS traffic filtering is the ability to drop traffic based on certain characteristics going from and to subscribers and also, in some embodiments, is based on internal communication entities inside a CM such as eSAFE or eMTA. Traffic filtering through proxy server 200 is supported in this same fashion.

DOCSIS Security

DOCSIS security authentication is managed by programming an X.509 certificate into a CM's memory. Proxy server 200 thus configures X.509 certificates for the ONUs in the same fashion. Proxy server 200 possesses CA certificates that are used in the validation of ONU certificates. Update status for certificate validity is provided by the certificate revocation server 160 of FIG. 1.

DOCSIS proxy server ensures additional security by managing the encryption for data traffic to each of the ONUs. For example, AES128 symmetric keys can be used for both encryption and decryption to ensure that one ONU cannot eavesdrop on another ONU's data traffic.

DOCSIS Multicast

Proxy server 200 may support all the advanced multicast features of DOCSIS 3.0 such as multicast authentication, multicast QoS, and SSM. In addition, proxy server 200 supports snooping of IGMP and MLD messages and forwards traffic for requested multicast groups to specific ONU ports in an analogous fashion as supported in DOCSIS.

Subscriber Management

Subscriber management is related to CPE IP addresses. There features relate to how the MAC and IP addresses of CPE devices connected behind an ONU are discovered and reported. Thus, proxy server 200 supports the necessary DOCSIS subscriber management features such as: an indication of IP addresses assigned to CPE's; a limitation on the number of IP addresses available to CPE's; a limitation on the number of possible MAC addresses; anti-spoofing filtering with regard to source and destination configured IP address traffic; ARP proxy service; and DHCP snooping services.

It will be appreciated that the DOCSIS standard may continue to evolve. Advantageously, proxy server 200 is readily adapted to accommodate such future feature. In that regard, embodiments described above illustrate but do not limit the invention. It should also be understood that numerous modifications and variations are possible in accordance with the principles of the present invention. Accordingly, the scope of the invention is defined only by the following claims.

We claim:

1. A system, comprising:
an optical line terminal (OLT) shelf including a plurality of optical line cards, each optical line card supporting at least one passive optical network (PON) interface for communicating with a corresponding set of optical network units (ONUs), the OLT shelf thereby corresponding to a plurality of OLTs for communicating with a plurality of sets of ONUs; and
a system controller card for controlling the plurality of optical line cards; and
a data over cable service interface specification (DOCSIS) proxy configured to emulate a cable modem (CM) simple network management protocol (SNMP) agent for each ONU, the DOCSIS proxy being responsive to an SNMP manager in a DOCSIS network management system (NMS) to configure emulated SNMP agents accordingly through the system controller card, the SNMP manager thereby managing the plurality of sets of ONUs as emulated DOCSIS cable modems, wherein the DOCSIS proxy also emulates an SNMP agent for the OLTs such that the SNMP manages the OLTs as an emulated single cable modem terminated system (CMTS).

2. The system of claim 1, wherein the system controller card is configured to control the optical line cards through an inter-card communication (ICC) protocol.

3. The system of claim 2, where in the DOCSIS proxy is configured to communicate with the system controller card using a remote procedure call (RPC) protocol.

4. The system of claim 1, wherein the DOCSIS proxy includes a first Ethernet interface to communicate with the SNMP manager and a second Ethernet interface to communicate with the system controller card.

5. The system of claim 1, wherein the DOCSIS proxy is configured with multiple IP addresses, each IP address corresponding to an address for respective ones of the emulated cable modems (CMs) and the emulated CMTS, and where in the DOCSIS proxy emulates a separate instance of SNMP management information base (MIB) for each emulated cable modem.

6. The system of claim 5, wherein the DOCSIS proxy is configured to monitor UDP sockets for all IP addresses corresponding to the emulated CMs and the emulated CMTS, and where in the DOCSIS proxy includes a database that maps each MIB to a corresponding array in the database, wherein each array is indexed by an identifying variable corresponding to respective ones of the cable modem IP addresses such that each cable modem IP address corresponds uniquely to a corresponding one of the identifying variable.

7. The system of claim 6, wherein the DOCSIS proxy is configured to respond to SNMP PDU requests received on one of the monitored UDP sockets by writing the associated identifying variable to a local thread variable, and wherein the DOCSIC proxy is further configured with a MIB handling function that reads the associated identifying variable from the local thread variable, decodes the PDU request, and accesses a corresponding instance in the database responsive to the decoded PDU and the associated identifying variable.

8. A system, comprising:
an optical line terminal (OLT) shelf including a plurality of optical line cards, each optical line card supporting at least one passive optical network (PON) interface for communicating with a corresponding set of optical network units (ONUs), the OLT shelf thereby corresponding to a plurality of OLTs for communicating with a plurality of sets of ONUs; and a system controller card for controlling the plurality of optical line cards; and a data over cable service interface specification (DOCSIS) proxy operable to emulate a cable modem with regard to each ONU and to emulate a single CMTS for the plurality of OLTs such that the DOCSIS proxy provisions each ONU according to a corresponding emulated cable modem's configuration file.

9. The system of claim 8, wherein the DOCSIS proxy is configured to provision each ONU responsive to a registration of the ONU with its corresponding OLT.

10. The system of claim 9, wherein the DOCSIS proxy is further configured to emulate DOCSIS quality of service (QoS) functions for the emulated cable modems corresponding to the ONUs.

11. The system of claim 9, wherein the DOCSIS proxy is further configured to emulate DOCSIS multicast functions for the emulated cable modems corresponding to the ONUs.

12. The system of claim 9, wherein the DOCSIS proxy is further configured to emulate DOCSIS security functions for the emulated cable modems corresponding to the ONUs.

13. The system of claim 9, wherein the DOCSIS proxy is further configured to emulate DOCSIS subscriber management functions for the emulated cable modems corresponding to the ONUs.

* * * * *